(12) United States Patent
Nakagami et al.

(10) Patent No.: US 7,977,900 B2
(45) Date of Patent: Jul. 12, 2011

(54) INVERTER SYSTEM FOR VEHICLE-MOUNTED AIR CONDITIONER

(75) Inventors: Takashi Nakagami, Aichi-ken (JP); Koji Nakano, Aichi-ken (JP); Masahiko Asai, Aichi-ken (JP); Makoto Hattori, Aichi-ken (JP); Kazuki Niwa, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 472 days.

(21) Appl. No.: 12/298,976

(22) PCT Filed: Jul. 16, 2008

(86) PCT No.: PCT/JP2008/062863
§ 371 (c)(1),
(2), (4) Date: Oct. 29, 2008

(87) PCT Pub. No.: WO2009/041151
PCT Pub. Date: Apr. 2, 2009

(65) Prior Publication Data
US 2009/0230902 A1   Sep. 17, 2009

(30) Foreign Application Priority Data

Sep. 28, 2007 (JP) .................. 2007-256311

(51) Int. Cl.
*H02P 27/00* (2006.01)

(52) U.S. Cl. ........... 318/400.3; 318/400.26; 318/400.01; 318/139; 318/700

(58) Field of Classification Search ............... 318/400.3, 318/400.26, 400.01, 139, 700
See application file for complete search history.

(56) References Cited

U.S. PATENT DOCUMENTS 4,667,480 A * 5/1987 Bessler .......................... 62/180
5,963,442 A * 10/1999 Yoshida et al. .................. 363/98

FOREIGN PATENT DOCUMENTS

JP           3351330 B2    11/2002

* cited by examiner

*Primary Examiner* — Bentsu Ro
*Assistant Examiner* — David S Luo
(74) *Attorney, Agent, or Firm* — Westerman, Hattori, Daniels & Adrian, LLP

(57) ABSTRACT

The object is to provide an inverter system for a vehicle-mounted air conditioner capable of reducing standby power requirements during nonuse. The voltage supply from a communication power source 80 is turned on and off on the basis of a signal from a communication driver 27a and an electric switch is changed over, whereby the voltage supply from a vehicle-mounted battery power source 50 to a DC-DC converter 26 is turned on and off and the voltage supply to a motor-control microcomputer 24 and a gate circuit 22 is turned on and off. As a result of this, during nonuse the operating state of the motor-control microcomputer 24 is shifted to a sleep mode by performing control by a host ECU 60, whereby the voltage supply is suspended and it becomes possible to reduce power consumption.

6 Claims, 3 Drawing Sheets

INVERTER SYSTEM FOR VEHICLE-MOUNTED AIR CONDITIONER

TECHNICAL FIELD

The present invention relates to an inverter system for a vehicle-mounted air conditioner.

BACKGROUND ART

A motor that drives a compressor constituting a vehicle-mounted air conditioner is controlled in the operation thereof by an inverter system.

As shown in FIG. 3, a conventional inverter system 1 has hitherto been operating in order to drive a motor 2 at a low voltage obtained by converting a high voltage of not less than 100 V supplied from a high-voltage power source 3 to a voltage on the order of 5 V by use of a noninsulating DC-DC converter 4. This inverter system 1 performs communication via a communication interface 5 to control a vehicle-mounted air conditioner and for other purposes. Other electrical equipment systems of the vehicle including a host ECU 6 and the like for the inverter system 1 operate at voltages supplied from a vehicle-mounted battery power source 7, such as 12 V and 24V. If a high voltage for driving the motor 2 is applied to the other electrical equipment systems for some reasons, this leads to a failure. For this reason, it is ensured that the inverter system 1 and the other electrical equipment systems can perform communication while being insulated by insulating communication connectors 8, such as photocouplers (refer to Patent Document 1, for example).

Patent Document 1: Japanese Patent No. 3351330

In recent years, with the control of vehicles more sophisticated, failure diagnoses and the like of each part of an electrical equipment system of a vehicle have also been carried out. In the conventional inverter system 1, however, a motor-control microcomputer 9 that governs the inverter system 1 cannot be started unless the high-voltage power source 3 side is started up. That is, it is impossible to establish communication between the host ECU 6 and the inverter system 1 at the same time with the application of the vehicle-mounted battery power source 7. Therefore, with the application of the vehicle-mounted battery power source 7 alone, it is impossible to perform a failure diagnosis of a circuit that receives power from the high-voltage power source 3 side.

Therefore, it also conceivable to supply power to the inverter system 1 from the high-voltage power source 3 side in order to perform a failure diagnosis. However, in a case where a switching element 10 for driving the motor 2 or the like is at fault due to a short, since grounding is shared by the motor 2 side and the inverter system 1 side, there is a possibility that both the motor 2 and the inverter system 1 become broken down if a high voltage is applied from the high-voltage power source 3 side to the inverter system 1.

As for an inverter system for a vehicle-mounted air conditioner that controls the operation of a motor for driving a compressor constituting the vehicle-mounted air conditioner, therefore, the present inventors have already presented a technique in that the inverter system for a vehicle-mounted air conditioner comprises a switching element for rotatably driving the motor, a gate circuit for driving a gate of the switching element, a control circuit that controls the supply of a current to the gate circuit, and a communication interface that performs communication with a host control circuit that issues commands to the control circuit from outside the inverter system, and is characterized in that the inverter system for a vehicle-mounted air conditioner is insulated from a first power source that applies a first predetermined voltage to the motor, and receives voltage supply from a second power source that applies a second voltage lower than the first voltage to the host control circuit (Japanese Patent Application No. 2007-55211.

As a result of this, even when shorts and the like have occurred in the circuit to which the first voltage is applied from the first power source, the first voltage is not applied any more to the side of the inverter system for a vehicle-mounted air conditioner and it has become possible to prevent failures in the inverter system for a vehicle-mounted air conditioner.

The present inventors conducted further studies on such an inverter system for a vehicle-mounted air conditioner.

In systems using electricity, it is required to reduce power consumption and standby power requirements even a little and this is not limited to an inverter system for a vehicle-mounted air conditioner. Particularly, in a vehicle-mounted system, reducing standby power requirements during nonuse has become a challenge in order to prevent the consumption of a battery, and also in the inverter system for a vehicle-mounted air conditioner proposed by the present inventors, reducing standby power requirements was demanded.

The present invention has been accomplished on the basis of such a technical challenge, and the object is to provide an inverter system for a vehicle-mounted air conditioner capable of reducing standby power requirements during nonuse.

DISCLOSURE OF THE INVENTION

The present invention accomplished to achieve the object described above provides an inverter system for a vehicle-mounted air conditioner that controls the operation of a motor for driving a compressor constituting the vehicle-mounted air conditioner, comprising a switching element for rotatably driving the motor, a gate circuit for driving a gate of the switching element, a control circuit that controls the supply of a current to the gate circuit, an insulating DC-DC converter that converts a voltage supplied from a power source, which is insulated from the switching element, the gate circuit and the control circuit, to a prescribed voltage and applies the voltage to the gate circuit and the control circuit, a communication section that operates at a voltage supplied from the power source and transmits a control signal from a host control circuit outside the inverter system to the control circuit, and a sleep-mode shift control section that interrupts the application of a voltage from the DC-DC converter to the control circuit when a signal requiring the interruption of the application of a voltage to the control circuit has been received in the communication section from the host control circuit.

The sleep-mode shift control section may have any configuration so long as the sleep-mode shift control section can interrupt the application of a voltage from the DC-DC converter to the control circuit. For example, the sleep-mode shift control section may comprise signal output means that outputs a predetermined signal when a signal requiring the interruption of the application of a voltage to the control circuit has been received from the host control circuit, and voltage application interrupting means that interrupts the application of a voltage from the DC-DC converter to the control circuit when the signal is received. The inverter system for a vehicle-mounted air conditioner may comprise, as the signal output means, a communication power source that converts a voltage supplied from the power source to a prescribed voltage and applies the voltage to the communication section and may further comprise, as the voltage application interrupting means, a switch that breaks a voltage supply circuit from the power source to the DC-DC converter depending on whether a voltage from the communication power source is applied or not. In this case, it is necessary only that the sleep-mode shift control section suspend the application of a voltage to the communication section in the communication power source when the sleep-mode shift control section has received a signal requiring the interruption of the application of a voltage to the control circuit from the host control circuit. As a result of this, it is possible to break the power supply circuit from the power source to the DC-DC converter.

There is no intension of limiting the position and the like of the switch so long as the application of a voltage to the communication section can be suspended. For example, the switch can be provided between the communication power source and the DC-DC converter. A transistor may be used for the switch.

The switch may also be changed over by other control means, for example, based on a control signal outputted directly from the host control circuit, instead of being changed over depending on whether a voltage from the communication power source is applied or not.

This inverter system for a vehicle-mounted air conditioner may be insulated from a first power source that applies a first predetermined voltage to the motor, and receive voltage supply from a second power source that applies a second voltage lower than the first voltage to the host control circuit.

According to the present invention, during nonuse the operating state of the control circuit is shifted to the sleep mode by performing control by the host control circuit, whereby the voltage supply is suspended and power consumption can be reduced.

DESCRIPTION OF SYMBOLS

20 . . . Inverter system (inverter system for a vehicle-mounted air conditioner), 21 . . . Switching element, 22 . . . Gate circuit, 24 . . . Motor-control microcomputer (control circuit), 26 . . . DC-DC converter, 27 . . . Communication circuit (communication section), 27a . . . Communication driver, 27b . . . Photocoupler, 30 . . . Motor, 40 . . . High-voltage power source, 50 . . . Vehicle-mounted battery power source, 80 . . . Communication power source (sleep-mode shift control section, signal output means), 81 . . . Electric switch (sleep-mode shift control section, voltage application interrupting means, switch)

BEST MODE FOR CARRYING OUT THE INVENTION

The present invention will be described below in detail on the basis of the embodiment shown in the accompanying drawings.

Figure 1:
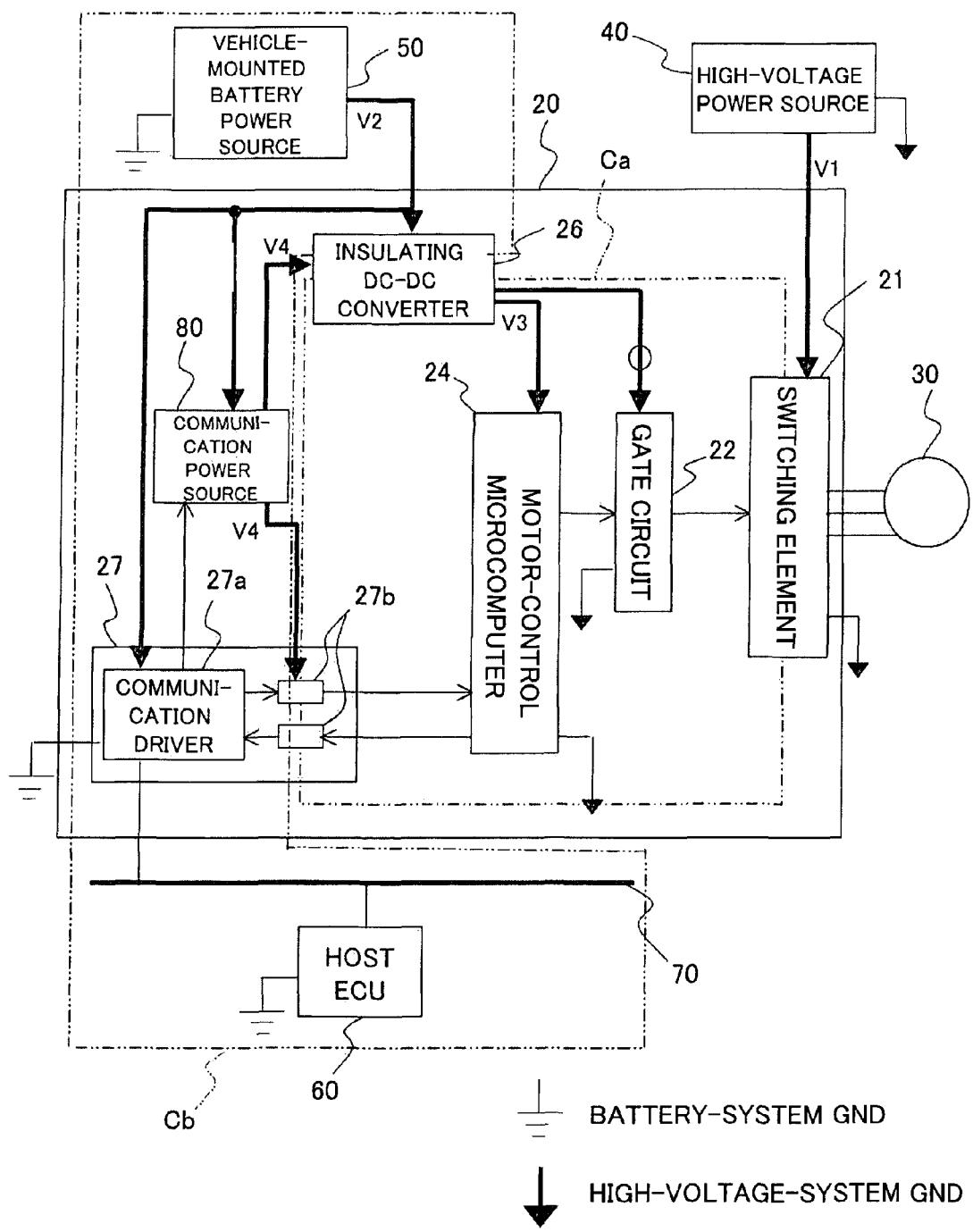
FIG. 1 is a diagram showing the configuration of an inverter system for a vehicle-mounted air conditioner in a present embodiment.

FIG. 1 is a diagram to explain the configuration of an inverter system (an inverter system for a vehicle-mounted air conditioner) 20 in the present embodiment.

As shown in FIG. 1, the inverter system 20 controls the driving of a motor 30 that provides a driving source of a compressor constituting a vehicle-mounted air conditioner.

The inverter system 20 comprises a switching element 21, a gate circuit 22 and a motor-control microcomputer (a control circuit) 24.

The motor 30 is driven at a high voltage (a first voltage) V1 supplied from a high-voltage power source 40, such as a high-voltage battery and a generator. The high voltage V1 is 300 V, for example.

The switching element 21 converts a direct current supplied from the high-voltage power source 40 to a three-phase alternating current and outputs the three-phase alternating current to the motor 30 in order to drive this motor 30.

The gate circuit 22 drives a gate of the switching element 21 through the control by the motor-control microcomputer 24.

A motor control circuit Ca of the inverter system 20 comprising the switching element 21, the gate circuit 22 and the motor-control microcomputer 24 operates at a low voltage (a third voltage) V3. The low voltage V3 is 5 V, for example. The voltage supply to the motor control circuit Ca is performed by converting a battery voltage (a second voltage) V2 supplied from a vehicle-mounted battery power source (a second power source) 50 to the above-described low voltage V3 in an insulating DC-DC converter 26. The battery voltage V2 is 12 V and 24 V, for example. This DC-DC converter 26 is of an insulating type and insulates the motor control circuit Ca and another electrical system circuit Cb of the vehicle that operates at the battery voltage V2 supplied from the vehicle-mounted battery power source 50 from each other.

The motor-control microcomputer 24 drives and controls the motor 30 on the basis of a command signal from a host ECU (a host control circuit) 60. For this reason, the inverter system 20 can perform CAN (control apparatus area network) communication via a communication circuit (a communication section) 27 with a CAN bus 70 for performing communication with the ECU that governs the control of each pieces of electrical equipment mounted on the vehicle. This communication circuit 27 is composed of a communication driver 27a that governs CAN communication and a photocoupler 27b for performing data exchange while ensuring electrical insulation between the communication driver 27a and the motor-control microcomputer 24.

The communication driver 27a is driven by the battery voltage V2 supplied from the vehicle-mounted battery power source 50.

This inverter system 20 comprises a communication power source (a sleep-mode shift control section, signal output means) 80 for driving the photocoupler 27b. The communication power source 80 converts the battery voltage V2 supplied from the vehicle-mounted battery power source 50 to a low voltage V4, for example, 5 V, and supplies the low voltage V4 to the photocoupler 27b.

Note that by meeting requirements from the host ECU 60, the communication driver 27a shifts the operating status of the motor-control microcomputer 25 to a sleep mode or outputs a signal for a return from the sleep mode to the communication power source 80.

The communication power source 80, along with the above-described photocoupler 27b, applies the low voltage V4 also to the DC-DC converter 26. And the communication power source 80 suspends voltage application to the photocoupler 27b and the DC-DC converter 26 when a signal for shifting the operating status of the motor-control microcomputer 24 to the sleep mode has been inputted from the communication driver 27a, and the communication power source 80 starts voltage application to the photocoupler 27b and the DC-DC converter 26 when a signal for causing the motor-control microcomputer 24 to return from the sleep mode has been inputted.

Figure 2:
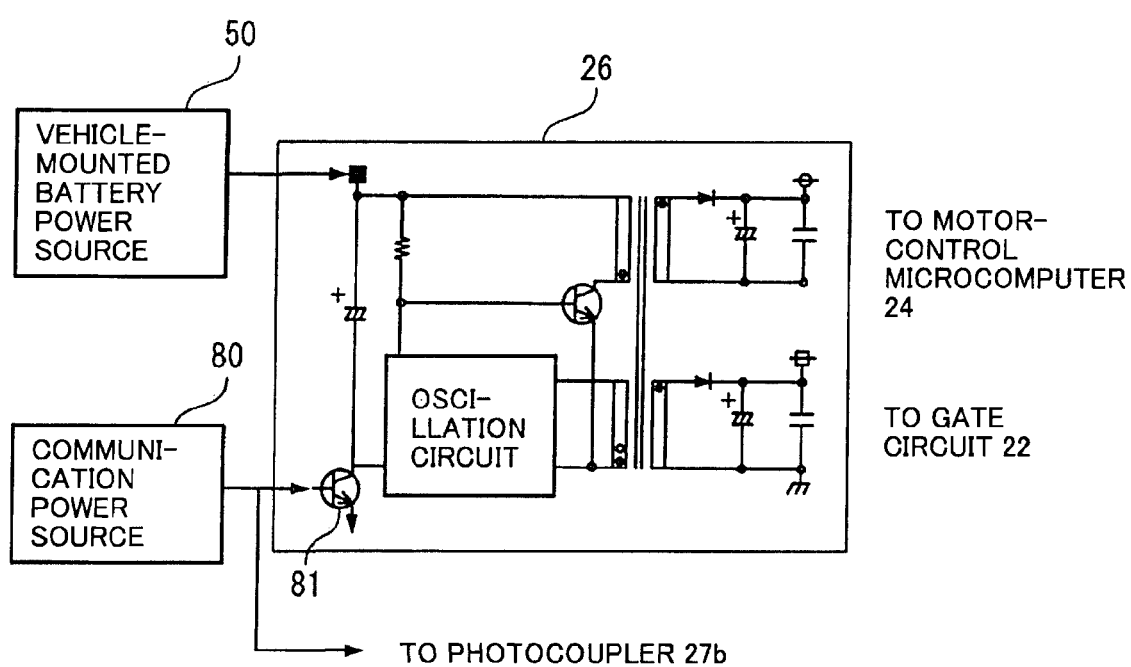
FIG. 2 is a diagram showing a switch provided in a DC-DC converter.
Figure 3:
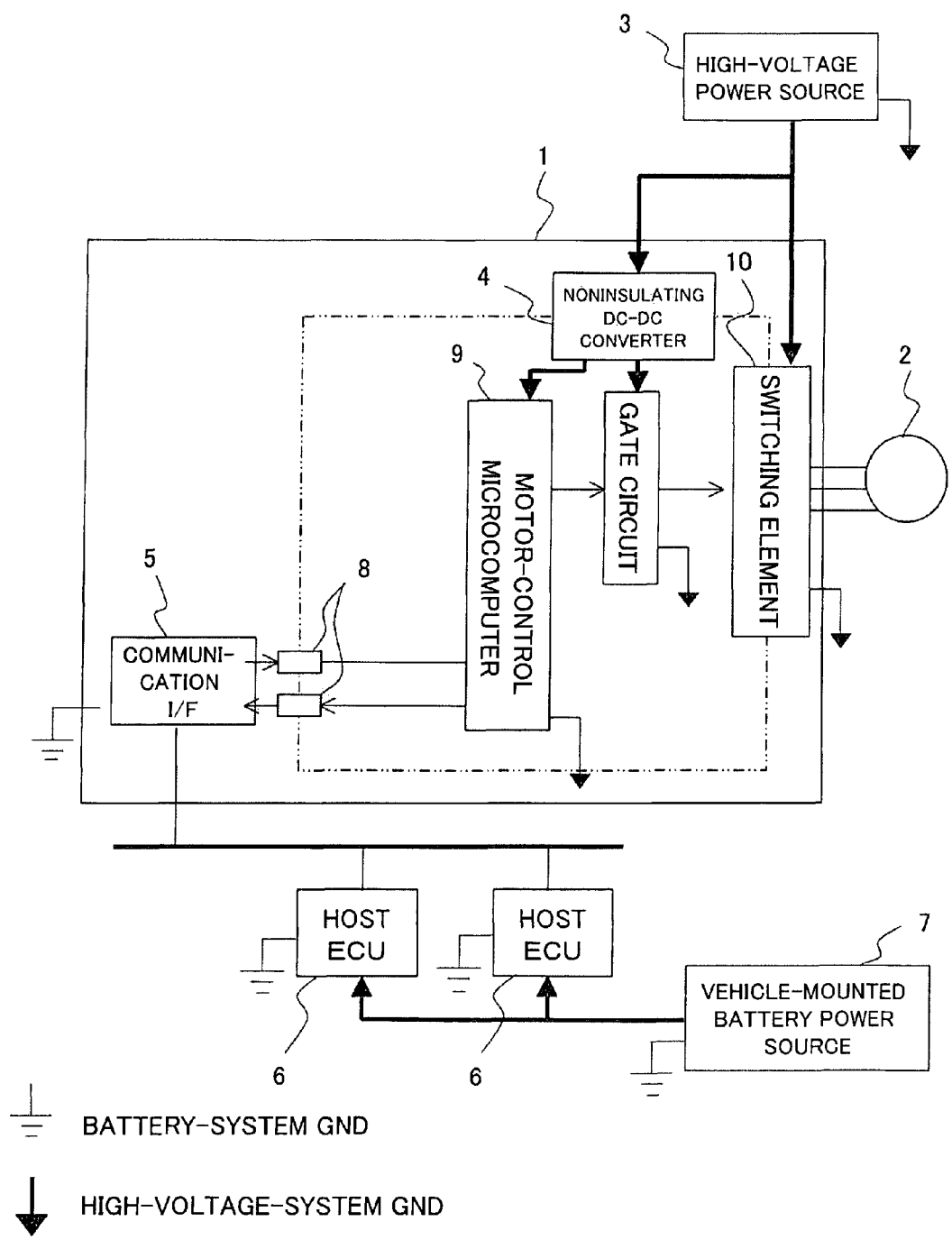
FIG. 3 is a diagram showing the configuration of a conventional inverter system of a vehicle-mounted air conditioner.

As shown in FIG. 2, the DC-DC converter 26 comprises an electric switch (a sleep-mode shift control section, voltage application interrupting means, switch) 81, such as a transistor, between the DC-DC converter 26 and the communication power source 80. The electric switch 81 becomes on when the application of the low voltage V4 from the communication power source 80 is being performed, and becomes off when the application of the low voltage V4 from the communication power source 80 is not performed (0 V). When the electric switch 81 is on, the voltage supply from the vehicle-mounted battery power source 50 to the DC-DC converter 26 is performed as usual. Then, due to an output from the DC-DC converter 26, a voltage is supplied to the motor-control microcomputer 24 and the gate circuit 22, which go into action.

When the electric switch 81 is off, the voltage supply circuit from the vehicle-mounted battery power source 50 to the DC-DC converter 26 is broken. As a result of this, the output from the DC-DC converter 26 is suspended when the application of the low voltage V4 from the communication power source 80 is not performed, that is, in the duration from the input of a signal for shifting the operating status of the motor-control microcomputer 24 to the sleep mode to the input of a signal for causing the motor-control microcomputer 24 to return from the sleep mode. When the output from the DC-DC converter 26 is suspended, the voltage supply to the motor-control microcomputer 24 and the gate circuit 22 is suspended and the operating status of the motor-control microcomputer 24 becomes off, whereby the operating status of the motor-control microcomputer 24 shifts to the sleep mode.

As described above, the voltage supply from the communication power source 80 is started and stopped on the basis of a signal from the communication driver 27a, whereby the electric switch 81 changes over, starting and stopping the voltage supply from the vehicle-mounted battery power source 50 to the DC-DC converter 26, with the result that the voltage supply to the motor-control microcomputer 24 and the gate circuit 22 can be started and stopped.

As a result of this, during nonuse the operating status of the motor-control microcomputer 24 is shifted to the sleep mode through the control by the host ECU 60 and the voltage supply is suspended, with the result that it becomes possible to reduce power consumption.

Even when the operating status of the motor-control microcomputer 24 is shifted to the sleep mode, the driving voltage is applied to the communication driver 27a and hence this mode shift has no disadvantage for the communication with the host ECU 60.

In addition, in realizing the above-described configuration, it is necessary only that the wiring between the communication power source 80 and the electric switch 81 and the electric switch 81 itself be added, and hence the above-described advantage can be obtained at low cost.

Note that in the above embodiment, the description was given of the circuit configuration and the like of the inverter system 20. However, no disadvantages will be produced even when the concrete configuration is changed so long as such changes enable the functions for realizing the gist of the present invention to be exhibited.

Furthermore, components described in the above embodiment can be appropriately selected and can be appropriately changed to other components so long as this does not depart from the gist of the present invention.

The invention claimed is:

1. An inverter system for a vehicle-mounted air conditioner that controls the operation of a motor for driving a compressor constituting the vehicle-mounted air conditioner, the inverter system comprising:
   a switching element for rotatably driving the motor;
   a gate circuit for driving a gate of the switching element;
   a control circuit that controls the supply of a current to the gate circuit;
   an insulating DC-DC converter that converts a voltage supplied from a power source, which is insulated from the switching element, the gate circuit and the control circuit, to a prescribed voltage and applies the voltage to the gate circuit and the control circuit;
   a communication section that operates at a voltage supplied from the power source and transmits a control signal from a host control circuit outside the inverter system to the control circuit; and
   a sleep-mode shift control section that interrupts the application of a voltage from the DC-DC converter to the control circuit when a signal requiring the interruption of the application of a voltage to the control circuit has been received in the communication section from the host control circuit.

2. The inverter system for a vehicle-mounted air conditioner according to claim 1, comprising:
   signal output means that outputs a predetermined signal when a signal requiring the interruption of the application of a voltage to the control circuit has been received from the host control circuit; and
   voltage application interrupting means that interrupts the application of a voltage from the DC-DC converter to the control circuit when the signal is received.

3. The inverter system for a vehicle-mounted air conditioner according to claim 2, comprising:
   as the signal output means, a communication power source that converts a voltage supplied from the power source to a prescribed voltage and applies the voltage to the communication section; and
   as the voltage application interrupting means, a switch that breaks a voltage supply circuit from the power source to the DC-DC converter depending on whether a voltage from the communication power source is applied or not; characterized in that the sleep-mode shift control section suspends the application of a voltage to the communication section by the communication power source when the sleep-mode shift control section has received a signal requiring the interruption of the application of a voltage to the control circuit from the host control circuit.

4. The inverter system for a vehicle-mounted air conditioner according to claim 3, characterized in that the switch is provided between the communication power source and the DC-DC converter.

5. The inverter system for a vehicle-mounted air conditioner according to claim 3, characterized in that the switch is a transistor.

6. The inverter system for a vehicle-mounted air conditioner according to claim 1, characterized in that the inverter system for a vehicle-mounted air conditioner is insulated from a first power source that applies a first, predetermined voltage to the motor, and receives voltage supply from a second power source that applies a second voltage lower than the first voltage to the host control circuit.

* * * * *